United States Patent
Bool, III et al.

(10) Patent No.: US 6,382,958 B1
(45) Date of Patent: May 7, 2002

(54) AIR SEPARATION METHOD AND SYSTEM FOR PRODUCING OXYGEN TO SUPPORT COMBUSTION IN A HEAT CONSUMING DEVICE

(75) Inventors: Lawrence E. Bool, III, Hopewell Junction; Hisashi Kobayashi, Putnam Valley, both of NY (US)

(73) Assignee: Praxair Technology, Inc., Danbury, CT (US)

(*) Notice: Subject to any disclaimer, the term of this patent is extended or adjusted under 35 U.S.C. 154(b) by 7 days.

(21) Appl. No.: 09/614,519

(22) Filed: Jul. 12, 2000

(51) Int. Cl.$^7$ ................................. F23B 11/04
(52) U.S. Cl. ..................... 431/2; 431/11; 431/215; 122/1 A; 122/DIG. 1; 95/54; 95/288
(58) Field of Search ................... 431/2, 11, 12, 431/215; 95/45, 43, 54, 288, 41, 96; 122/5.51, 1 A, 18.1, 18.2, DIG. 1, DIG. 2

(56) References Cited

U.S. PATENT DOCUMENTS

| | | | |
|---|---|---|---|
| 5,035,727 A | 7/1991 | Chen | 55/16 |
| 5,516,359 A | 5/1996 | Kang et al. | 95/14 |
| 5,565,017 A | 10/1996 | Kang et al. | 95/14 |
| 5,643,354 A | 7/1997 | Agrawal et al. | 75/490 |
| 5,657,624 A | 8/1997 | Kang et al. | 60/39.02 |
| 5,753,007 A * | 5/1998 | Russek et al. | 95/54 |
| 5,855,648 A | 1/1999 | Prasad et al. | 95/54 |
| 5,888,272 A | 3/1999 | Prasad et al. | 95/54 |
| 5,935,298 A | 8/1999 | Prasad et al. | 95/39 |
| 5,954,859 A | 9/1999 | Keskar et al. | 95/54 |
| 5,975,223 A | 11/1999 | Karlsson | 175/374 |

OTHER PUBLICATIONS

Torpey et al., "Design and Development of a Pulverized Char Combustor for the High Performance Power System", Advanced Coal–Based Power and Environmental Systems '98 Conference (1998).
Seery et al., "Engineering Development of a Coal–Fired High Performance Power Generating System", Advanced Coal–Based Power and Environmental Systems '98 Conference (1998).

* cited by examiner

Primary Examiner—James C. Yeung
(74) Attorney, Agent, or Firm—David M. Rosenblum

(57) ABSTRACT

A method and system to separate oxygen from air for producing oxygen to support combustion of a fuel, thereby to produce heat in a heat consuming device. In accordance with the method and system a heated and compressed air stream is introduced into a ceramic membrane system having one or more oxygen-selective, ion conducting membranes to produce an oxygen permeate stream which is used to support combustion of the fuel. The compressed air stream is heated within the heat consuming device itself which can be, for instance, a furnace or a boiler, through indirect heat exchange with flue gases or by radiant heat within a radiant heat exchange zone thereof. An oxygen lean retentate stream, produced through separation of oxygen from the compressed and heated air stream, can be expanded with the performance of work to produce an expanded air stream. The work of expansion can be applied to the compression of the incoming air stream. The expanded air stream can be used to preheat the compressed and heated air stream.

14 Claims, 2 Drawing Sheets

AIR SEPARATION METHOD AND SYSTEM FOR PRODUCING OXYGEN TO SUPPORT COMBUSTION IN A HEAT CONSUMING DEVICE

FIELD OF THE INVENTION

The present invention relates to an air separation method and system for producing oxygen to support combustion of a fuel. More particularly, the present invention relates to such a method and system in which the combustion produces heat for a heat consuming device. Even more particularly, the present invention relates to such a method and system in which the air is heated within the heat consuming device and then separated within a ceramic membrane separation system to produce the oxygen.

BACKGROUND OF THE INVENTION

There are growing concerns about environmental issues arising from the emission of pollutants produced by fossil fuel fired combustion systems. Such combustion systems represent one of the largest sources of carbon dioxide in air pollution emissions. It is known that an effective way to reduce such emissions and to increase the efficiency of combustion is to use oxygen or oxygen-enriched air within the combustion process. The use of oxygen or oxygen-enriched air reduces stack heat losses, which increases the system efficiency, while at the same time reducing NOx emissions. Additionally, the concentration of carbon dioxide in the flue gas is higher since there is little or no nitrogen to act as a diluent. Such flue gas can be more readily used to produce a carbon dioxide rich stream for reuse or sequestration than flue gas having a high nitrogen content.

The use of oxygen to support combustion has found application in processes that require high temperatures, for instance, glass furnaces. In such applications, the fuel savings and other benefits achieved outweigh the cost of the oxygen. When air is used to support the combustion of the fuel for such high temperature applications, a significant part of the heating value of the fuel is expended in the heating of nitrogen contained within the air. This heat is then wasted when the resultant flue gas is exhausted at high temperatures. In low temperature exhaust systems, such as boilers, the resultant heat loss is much lower since more heat is recovered from the flue gas before it is exhausted to the atmosphere. Thus, in this case the use of oxygen is economically unattractive because the cost of the oxygen is greater than any available savings to be realized with reduced fuel consumption. In fact, when the energy required to conventionally produce the oxygen by known cryogenic and adsorptive processes is considered, the overall thermal efficiency decreases.

A major alternative to cryogenic or adsorptive production of oxygen is on-site production of oxygen through oxygen-selective, ion conducting ceramic membrane systems. In such systems, the membrane itself is impermeable to oxygen. The oxygen is compressed and ionized at one surface of the ceramic membrane. The oxygen ions are conducted through the membrane and recombined to form oxygen molecules. In the recombination, electrons are given up by the oxygen ions and either travel directly through the membrane or through a conductive pathway to ionize the oxygen at the opposite surface of the membrane. Such ceramic membranes conduct ions at high temperatures that can reach over 1000° C. Thus, in the prior art, auxiliary combustion is used to provide the high requisite operational temperatures of the ceramic membrane.

For instance, U.S. Pat. No. 5,888,272 discloses a process in which oxygen is separated from a compressed feed-gas stream in a transport module-combustor in which separated oxygen is used to support combustion of a fuel to produce the high operational temperatures for the membrane. In one embodiment, a membrane permeate stream is used in a downstream heat consuming process that produces an exhaust which is used to purge the permeate side of the membrane. The permeate stream can also be used to support combustion in an external combustor that is situated upstream of the heat consuming process. Part of the combustor exhaust can be used to supply additional purge gases. A portion of the relatively cool exhaust of the heat consuming process together with the heated retentate is used to heat the incoming air in an external heat exchanger.

U.S. Pat. No. 5,855,648 discloses a process to produce oxygen-enriched feed gas stream to be fed into a blast furnace. In accordance with this patent, air is compressed and heated. Part of the air, after having been heated in an external heat exchanger, is introduced into a ceramic membrane system to produce a permeate stream. The permeate stream is in turn introduced into the incoming heated air stream and used to make oxygen-enriched air for introduction into the furnace. A fuel can be added to the air to be separated in the ceramic me ran to support combustion within the membrane itself. Additionally, part of the compression energy can be recovered with an expander.

Although both patents contemplate an integration of a ceramic membrane system with a heat consuming device, neither contemplate a complete thermal integration of completely independent operating systems. For instance, in U.S. Pat. No. 5,888,272 even where oxy-fuel combustion is contemplated, the combustion and oxygen production are integral components, thus making it very difficult to operate such a heat consuming device without the oxygen production system. Further, the heating of air within an external heat exchanger through heat exchange with exhaust gases of the heat consuming process is inefficient in that there are invariably heat losses to the environment with such an arrangement. While U.S. Pat. No. 5,855,648 contemplates oxygen-enriched combustion within the heat consuming process itself, namely the blast furnace, the hot exhaust gases from such process are expelled without any provision for recovery of their heating value.

In both of the foregoing patents, the ceramic membrane system is utilized in processes in which combustion gases come in contact with the membrane. As such, both patents have limited application to the use of fuels having a high inorganic content, such as coal and heavy oil. Since cleaner fuel such as natural gas is generally more expensive than fuels having a high inorganic content, it is desirable to have a process and system that can be integrated with fuels with a high inorganic content.

As will be discussed, the present invention provides a method and system for oxygen or oxygen enhanced combustion within a heat consuming device that efficiently utilizes a ceramic membrane system to supply the oxygen. Further, a method and system in accordance with the present invention has applicability to low temperature exhaust systems such as a boiler or furnace and is readily capable of using fuels with a high inorganic content. Still further, such a system is designed such that the heat consuming device can be operated without the ceramic membrane if required.

SUMMARY OF THE INVENTION

The present invention provides a method of separating oxygen from air for producing oxygen to support combustion of a fuel, thereby to produce heat in a heat consuming device. In accordance with the method, a feed air stream is compressed to produce a compressed air stream. The compressed air stream is heated to an operational temperature of a ceramic membrane system employing at least one oxygen selective, ion conducting membrane. The compressed air stream is heated through indirect heat exchange and at least in part within the heat consuming device. After having been heated, the compressed air stream is introduced into the membrane system to produce an oxygen permeate and an oxygen depleted retentate. The fuel is burned in the presence of an oxidant made up at least in part from the oxygen permeate produced within the membrane system.

Advantageously, a retentate stream composed of the retentate can be expanded with the production of work and the work of expansion can be applied to compress the feed air stream. The expansion of the retentate stream produces an expanded retentate stream which can be used to pre-heat the compressed air stream through indirect heat exchange. Additionally, the feed air stream can be compressed to a pressure sufficient to drive the separation of oxygen from the air within the ceramic membrane system without for instance, the use of a purge stream.

In the heat consuming device a burnerproduces heated flue gases from the combustion of the fuel. The compressed air stream can be heated within the heat consuming device through indirect heat exchange with this heated flue gas. Alternatively, the heat consuming device is the type that is provided with a radiant heat exchange zone and the compressed air stream is primarily heated within the heat consuming device by radiant heat within the radiant heat exchange zone.

In another aspect, the present invention provides an air separation system for producing oxygen to support combustion of a fuel and thereby to produce heat in a heat consuming device. In accordance with this aspect of the present invention, a compressor is provided to compress a feed air stream and thereby to produce a compressed air stream. A ceramic membrane system is in communication with the compressor and employs at least one oxygen selective, ion conducting membrane to separate oxygen from the compressed feed air stream. A heat exchanger, located within the heat consuming device, is interposed between the compressor and the membrane system to heat the compressed air stream to an operational temperature of the membrane system. A means is provided for burning the fuel within the heat consuming device in the presence of an oxidant made up at least in part from the oxygen permeate produced within the membrane system.

Advantageously, the air separation system may employ an expander connected to the membrane system for expanding a retentate stream composed of the retentate with the production of work. A means can be provided for applying the work of expansion to power the compressor. A pre-heater can be interposed between the heat exchanger and the compressor and connected to the expander to pre-heat the compressed air stream through indirect heat exchange with an expanded retentate stream produced by the expander.

The fuel burning means can produce heated flue gases from the combustion of the fuel and the heat exchanger can be positioned within the heat consuming device such that the compressed air stream is heated through indirect heat exchange with the heated flue gases. Alternatively, the heat consuming device can be of the type provided with a radiant heat exchange zone and the heat exchanger can be located within the radiant heat exchange zone such that the compressed air stream is primarily heated by radiant heat within the radiant heat exchange zone. As may be appreciated, such a heat consuming device can be a boiler and the heat exchanger can comprise heat exchange tubes interspersed with steam tubes.

As is apparent from the above description of the present invention, an integration is contemplated in which the ceramic membrane system is thermally integrated with a heat consuming device that employs oxygen-enhanced combustion through oxygen produced within the ceramic membrane system. It should be noted that the placement of a heat exchanger within the heat consuming device would at first appear to be counterproductive or, at best, provide no additional benefits as compared to a conventional air-fired device.

In both the present invention and the prior-art air-fired case, air is heated as part of operating the heat consuming device. In conventional air-fired devices the air heating, in particular the inert components of the air, such as nitrogen, are heated within the combustion space. In the present invention the air heating is done indirectly through the use of heat exhangers. The configuration of the present invention would therefore, at first glance, appear to be identical to the conventional air fired case from the standpoint of thermal efficiency. Upon further examination, thermal efficiency of the present invention might in fact be expected to be less than that of the air fired case due to inevitable, environmental heat losses that are occasioned by the use of external heat exchange and the piping of heated permeate streams to the heat consuming device. However, the present invention actually provides a significant increase in efficiencies over prior art air fired cases. Typical air-fired boilers are anywhere from about 85% to about 90% efficient (based on higher heating value) limited by the minimum flue gas temperature to prevent acid gas corrosion of about 300° to 400° F. The present invention provides efficiencies of between about 90% and about 95% (higher heating value) for a similar system. The increased efficiency is due to the fact that the retentate stream can be cooled to much lower temperatures than the exhaust temperatures from air-fired systems. This allows much more of the heat input to the retentate to be recovered as compared to conventional air-fired systems. The efficiency can be increased still further if a condensing heat exchanger is used to further cool the flue gas stream; an option that is not typically available to air-fired units.

In embodiments of the present invention in which the compressor is powered by the expander, still further advantages are realized not only in the energy savings, but also in the fact that the separation can be solely driven by the pressure produced by the compressor without a purge that would tend to dilute the oxygen. The use of a pre-heater that uses the heat contained within the expanded retentate stream raises the thermal efficiency of a method or system in accordance with the present invention.

An additional advantage of the present invention is that the indirect heat exchange within the heat consuming device allows the use of fuels that contain significant amounts of inorganics because the ceramic membrane system can thereby operate without any combustion products ever entering the membranes. In a method and system contemplated by the present invention, the operation of the heat consuming device and the ceramic membrane system are somewhat decoupled. The heat consuming device can be operated without the oxygen production system, which aids in startup and shut down of the entire system. In this regard, in the event of a failure of the ceramic membrane system, the heat consuming device can still be operated using a backup oxygen supply. Further, turndown of the ceramic membrane system can be handled independently of the operation of the heat consuming device.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

DETAILED DESCRIPTION

Figure 1:
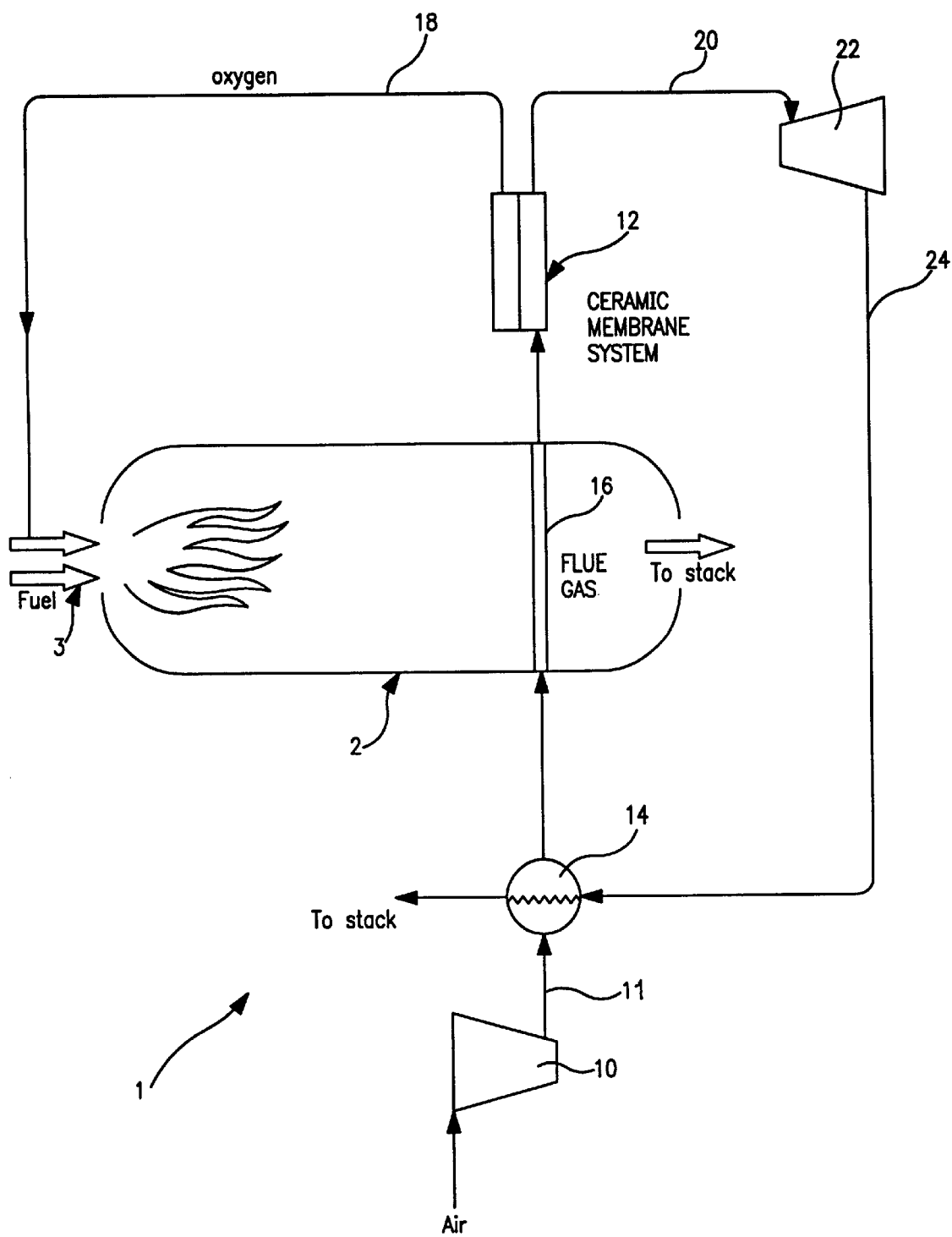
FIG. 1 is a schematic view of a system in accordance with the present invention in which incoming compressed air is heated by a heat exchanger located so as to indirectly exchange heat from flue gases.

With reference to the FIG. 1, an apparatus 1 is illustrated in which a furnace 2 consumes heat produced by combustion of a fuel 3.

Air is compressed in a compressor 10 at a pressure sufficient to drive a separation of oxygen from the air in a ceramic membrane system 12 employing one or more oxygen-selective, ion conducting membranes. It is to be noted, however, that the present invention should not be interpreted as excluding the use of a purge gas on the permeate side of the membranes. The oxygen-selective, ion conducting membranes are of the type that at high temperatures conduct oxygen ions, but will be impervious to the oxygen itself. The present invention contemplates the use of dual phase conducting membranes in which both oxygen and ions are conducted within the membrane as well as ionic membranes in which only oxygen ions are conducted. In ionic conducting membranes, a conductive pathway is provided for conduction of the electrons.

The air having been compressed within the compressor 10 forms a compressed air stream 11 that is preheated within a preheater 14. A heat exchanger 16 is provided within furnace 2 that is located so as to indirectly exchange heat between compressed air stream 11 within heat exchanger 16 and flue gases produced by combustion of fuel 3. The resultant temperate of compressed air stream 11, after passage through heat exchanger 16, is sufficient to reach the operational temperature of the membrane system 12. As such, compressed air stream 11 is never directly exposed to fuel 3.

Is to be noted that embodiments of the present invention possible than do not utilize preheater 14 and the compressed air steam 11 is heated solely within heat exchanger 16. The use of preheater 14, however, allows for the advantageous recovery of heat tat would otherwise be lost from the system. Although heat exchanger 16 is only illustrated as one pipe, as many pipes as necessary would be employed to provide the requisite heat transfer.

Oxygen is separated from compressed air stream 11 within membrane system 12 to produce a permeate stream 18 that consists of oxygen. Permeate stream 18 can be fed directly to an oxy-fuel burner to burn fuel 3, mixed with supplemental air for oxygen enriched combustion, or can be used for oxygen lancing purposes.

The retentate stream 20, which is oxygen depleted, can be passed into a turbine 22 to expand retentate stream 20 with the production of work. The work of expansion can then be applied to the compression of air within compressor 10 either directly by way of a mechanical linkage or indirectly by way of an electrical generator that would produce electricity used to power compressor 10. As may be appreciated, in applying such work of expansion, the electricity generated by a generator might be fed into the electrical grid from which power is drawn by compressor 10 in order to appropriately apply the work of expansion to the compression.

The expansion by expander 22 produces an expanded air stream 24 which is at a lower temperature and lower pressure than retentate stream 20. It still has, however, a sufficient temperature to allow it to be fed into preheater 14 for preheating compressed air stream 12. Expanded stream 24 can then be fed into the stack or be used for other purposes. As may be appreciated, embodiments of the present invention are possible that do not incorporate expander 22.

Figure 2:
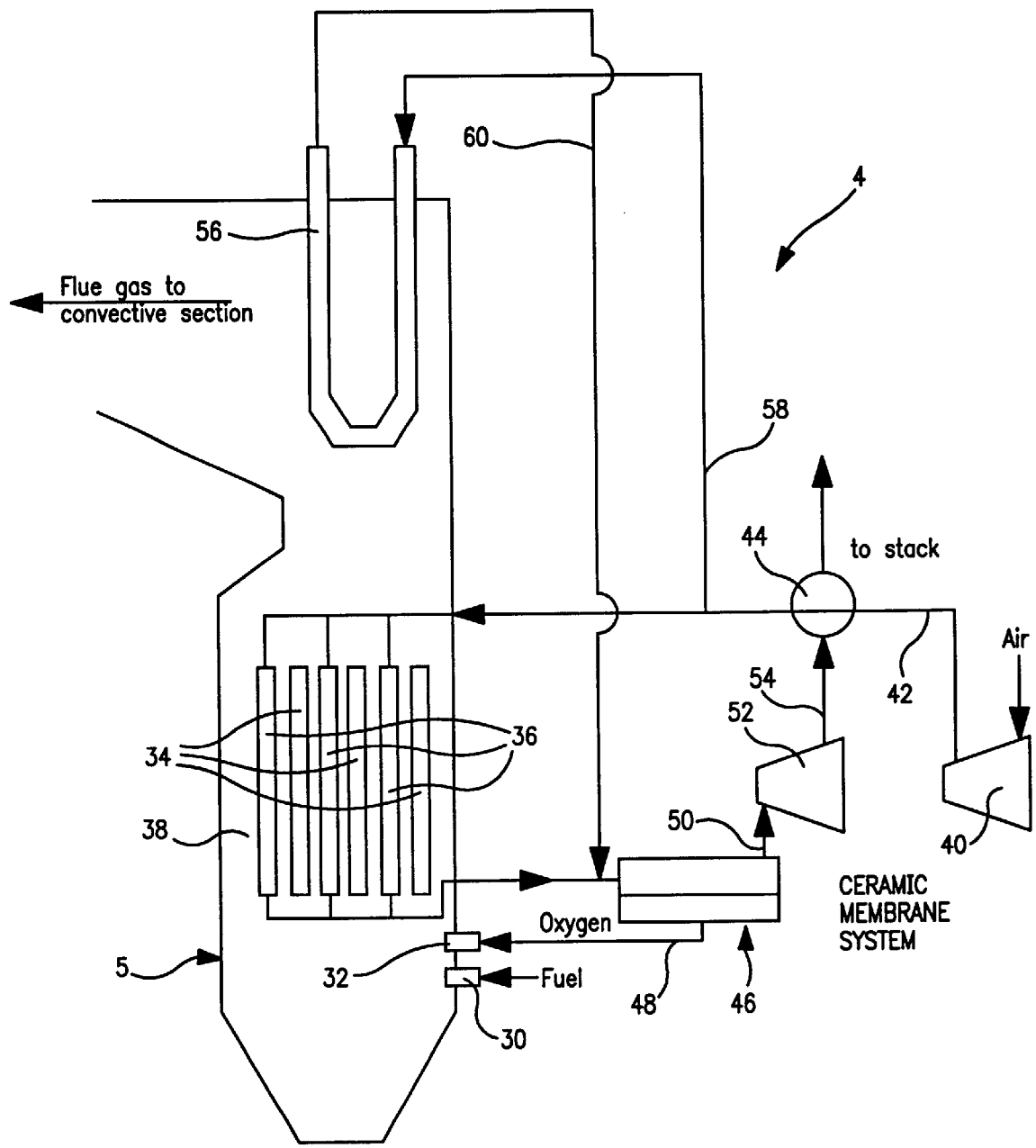
FIG. 2 is an alternative embodiment of the subject invention in which compressed air is heated primarily by radiant heat within a radiant heat exchange zone of the heat consuming device.

With reference to FIG. 2 an apparatus 4 is illustrated in which the combustion of a fuel supported by oxygen within a boiler 5. Boiler 5 has a fuel inlet nozzle 30 and an oxygen inlet nozzle 32. Conventional steam tubes 34 are preferably interspersed with air heating tubes 36 within a radiant heat exchange zone 38 thereof. Air heating tubes 36 are connected to one another to form a heat exchanger within radiant heat exchange zone 38. Incoming air is compressed by a compressor 40 to produce a compressed air stream 42 that is preheated within a preheater 44. The compressed air stream is then passed through air heating tubes 36 and then into a ceramic membrane system 46 employing one or more oxygen-selective, ion conducting membranes. The air heating tubes 36 function to heat compressed air stream 42 primarily by radiant heat although to at least a limited extent, convective heat transfer mechanisms maybe present. Oxygen separated from the air is then passed as a permeate stream 48 to oxygen nozzle 32. A retentate stream 50 lean in oxygen can then be expanded within an expander 52 to produce an expanded stream 54. Expanded air stream 54 can be introduced into preheater 44 that serves to impart heat to compressed air stream 42.

As in the embodiment shown in FIG. 1, embodiments of the present invention are contemplated that do not employ preheater 44 and that use a purge stream within ceramic membrane system 46. Further embodiments are possible in which expander 52 is not present.

Optionally, the apparatus 4 can use both radiant and convective heating by providing the heat exchanger 56 above radiant heat exchange zone 38 to heat a subsidiary air stream 58 formed from part of the incoming compressed air stream 42. The resultant heated subsidiary air stream 60 can then also be introduced into ceramic membrane system 46.

Although the present invention has been described with reference to a preferred embodiment, as will occur to those skilled in the art, numerous changes, additions and omissions may be made without departing from the spirit and scope of the present invention.

What is claimed is:

1. A method of separating oxygen from air for producing oxygen to support combustion of a fuel, thereby to produce heat in a boiler, said method comprising;

compressing a feed air stream to produce a compressed air stream;

heating the compressed air stream to an operational temperature of a membrane system employing at least one oxygen-selective, ion conducting membrane;

the compressed air stream being heated through indirect heat exchange and at least in part within said boiler by passing said compressed air stream through air heating tubes interspersed with steam tubes within a radiant heat exchange zone of said boiler;

introducing the compressed air stream, after having been heated, into the membrane systems to produce an oxygen permeate and an oxygen depleted retentate; and burning said fuel in the presence of an oxidant made up at least in part from the oxygen permeate produced within the membrane system.

2. The method of claim 1, further comprising:

expanding a retentate stream composed of the retentate with the production of work; and applying said work to compress said feed air stream.

3. The method of claim 2, wherein:

the expansion of said retentate stream produces an expanded retentate stream; and said compressed air stream is pre-heated through indirect heat exchange with said expanded retentate stream.

4. The method of claim 2, wherein the feed air stream is compressed to a pressure sufficient to drive the separation of oxygen from the air within the membrane system.

5. The method of claim 1, wherein:

the burning of the fuel produces heated flue gases; and said compressed air stream is also heated within said boiler through indirect heat exchange with said heated flue gases.

6. The method of claim 5, further comprising:

expanding a retentate stream composed of the retentate with the production of work; and applying said work to compress said feed air stream.

7. The method of claim 6, wherein:

the expansion of said retentate stream produces an expanded retentate stream; and said compressed air stream is pre-heated through indirect heat exchange with said expanded retentate stream and said expanded retentate stream.

8. The method of claim 7, wherein the feed air stream is compressed to a pressure sufficient to drive the separation of oxygen from the air within the membrane system.

9. An air separation system for producing oxygen to support combustion of a fuel and thereby to produce heat in a boiler, said air separation system comprising:

a compressor to compress a feed air stream and thereby to produce a compressed air stream;

a membrane system in communication with said compressor and employing at least one oxygen-selective, ion conducting membrane to separate oxygen from the compressed feed air stream;

a heat exchanger formed by air heating tubes interspersed with steam tubes within a radiant heat exchange zone of said boiler and interposed between said compressor and said membrane system to heat the compressed air stream to an operational temperature of the membrane system; and means for burning said fuel in the presence of an oxidant made up at least in part from the oxygen permeate produced within the membrane system.

10. The air separation system of claim 9 further comprising:

an expander connected to said membrane system for expanding a retentate stream composed of the retentate with the production of work; and means for applying said work to power said compressor.

11. The air separation system of claim 10, further comprising a pre-heater interposed between said heat exchanger and said compressor and connected to the expander to pre-heat said compressed air stream through indirect heat exchange with an expanded retentate stream produced by said expander.

12. The air separation system of claim 9, wherein:

said fuel burning means produces heated flue gases from the combustion of the fuel; and a further heat exchanger is positioned within said boiler such that said compressed air stream is also heated through indirect heat exchange with said heated flue gases.

13. The air separation system of claim 12, further comprising:

an expander connected to said membrane system for expanding a retentate stream composed of the retentate with the production of work; and means for applying said work to power said compressor.

14. The air separation system of claim 13, further comprising a pre-heater is interposed between said heat exchanger and said compressor and connected to the expander to pre-heat said compressed air stream through indirect heat exchange with an expanded retentate stream produced by said expander.

* * * * *